July 17, 1923.                                                                    1,462,152
L. M. SMITH
AUTOMOBILE FENDER
Filed May 1, 1922                3 Sheets-Sheet 1

July 17, 1923.

L. M. SMITH

AUTOMOBILE FENDER

Filed May 1, 1922

Patented July 17, 1923.

1,462,152

UNITED STATES PATENT OFFICE.

LEMON M. SMITH, OF CLAIRTON, PENNSYLVANIA.

AUTOMOBILE FENDER.

Application filed May 1, 1922. Serial No. 557,497.

*To all whom it may concern:*

Be it known that I, LEMON M. SMITH, a citizen of the United States, residing at Clairton, in the county of Allegheny and State of Pennsylvania, have invented new and useful Improvements in Automobile Fenders, of which the following is a specification.

This invention relates to protecting devices, and more particularly to what I term an automobile fender.

One of the main objects of the invention is to provide a fender or guard of simple construction and operation which extends about an automobile wheel so as to prevent splashing of mud etc., the fender serving to protect pedestrians and to also protect the body of the automobile against being splashed. A further object is to provide a fender of the character stated which may be readily applied to an automobile of standard construction. Further objects will appear from the detailed description.

In the drawings:—

Figure 3:
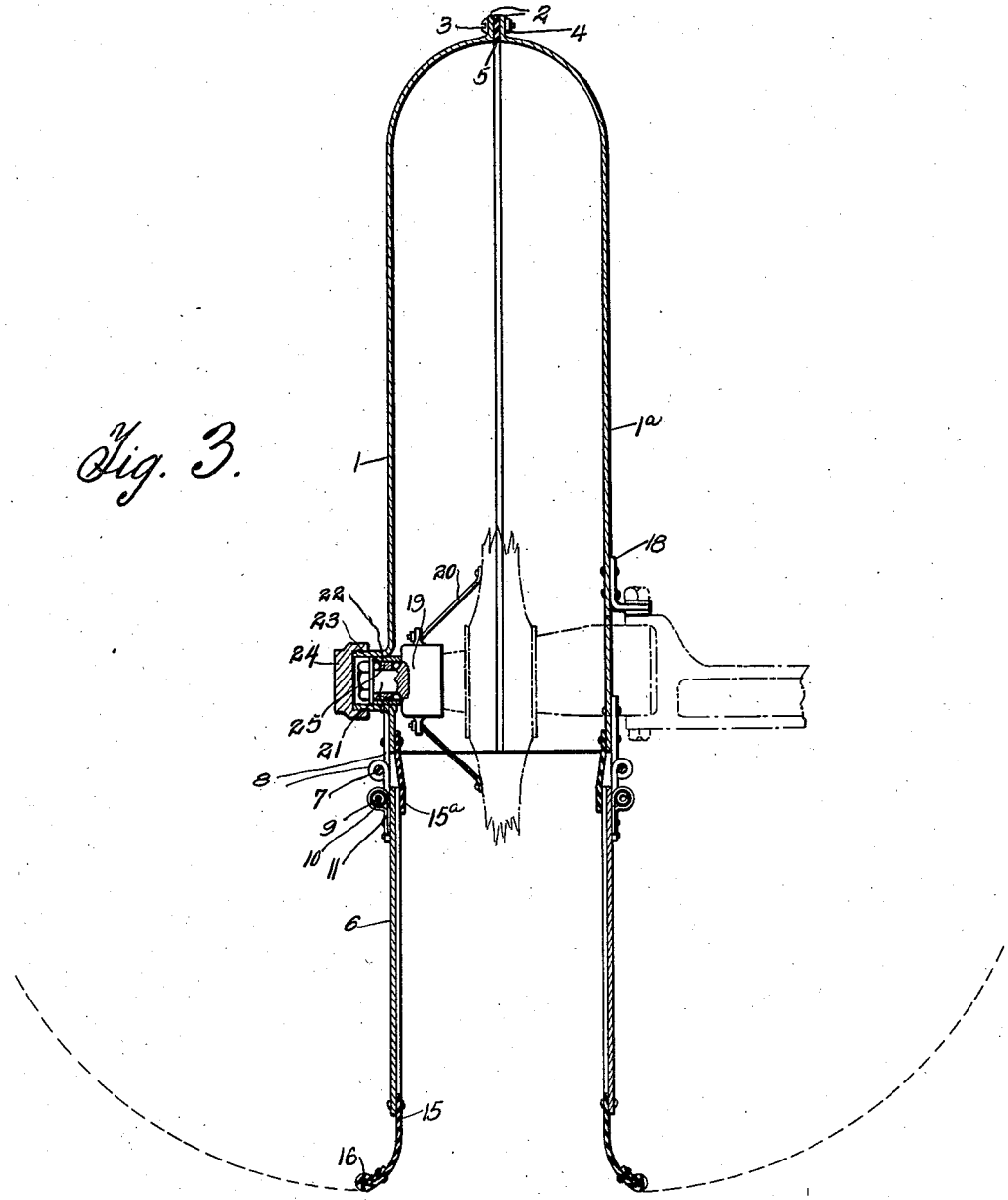
Figure 3 is a vertical sectional view through the front fender.
Figure 4:
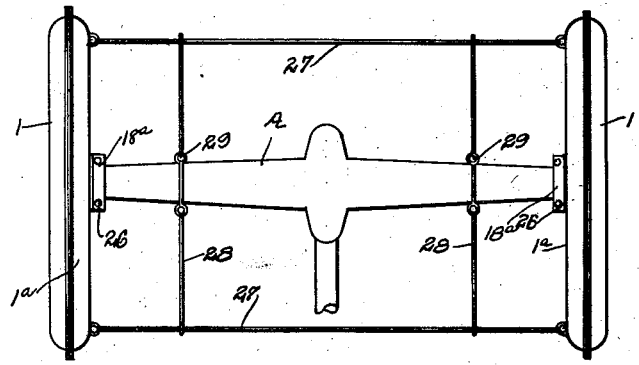
Figure 4 is a plan view showing the means for bracing the rear fenders.
Figure 5:
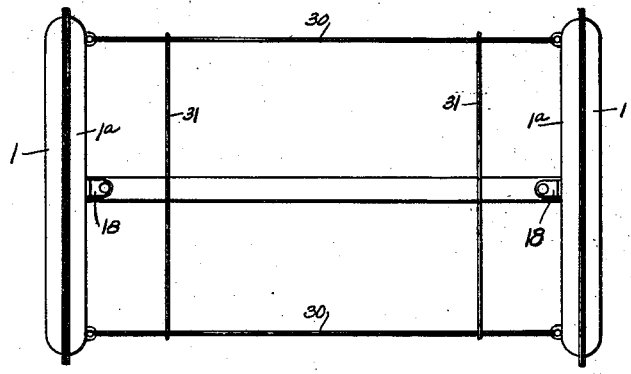
Figure 5 is a similar view showing the means for bracing the front fenders.

The front fender includes two upper plates 1 and 1ª of substantially semi-circular outline which are curved inwardly at their outer edge portions and are provided with flanges 2 secured together by bolts 3 and nuts 4, or in any other suitable or preferred manner, a strip 5 of rubber being preferably positioned between the flanges 2 to provide a packing and prevent any looseness or play. A sheet metal shield member 6 is hingedly secured, by means of a pintle rod 7 and straps 8 to the lower edge of each of the plates 1 and 1ª. A resilient rod 9 is mounted in sleeves 10 secured to shield 6 in parallelism with the upper edge thereof, by means of straps 11. The ends of this rod are bent upwardly substantially at right angles to provide fingers 12 which contact with the outer face of plate 1. The intermediate portion of rod 9 is bent to provide a downwardly projecting U-shaped element 13 which bears against the outer face of shield 6. The rod 9 thus provides a spring member which serves to normally hold shield 6 positioned in the plane of the plate to which it is attached. Inward movement of the shield member is positively limited by stop fingers 14 which are rigidly secured to and project downwardly from plates 1 and 1ª. If the wheel of the automobile enters a rut or depression the shields 6 can swing upwardly and outwardly about rods 7, as indicated in Fig. 3 and will be returned to normal position by the rods 9 upon the wheel regaining a level surface. This serves to prevent injury to the shields. A strip 15ª of rubber or other suitable material is secured to the inner face of plate 1 and plate 1ª and extends across the space between the plate and shield 6, this strip preventing mud etc. from spraying or splashing between the lower end of the casing formed of plates 1 and 1ª and the upper edges of the shields.

Figure 1:
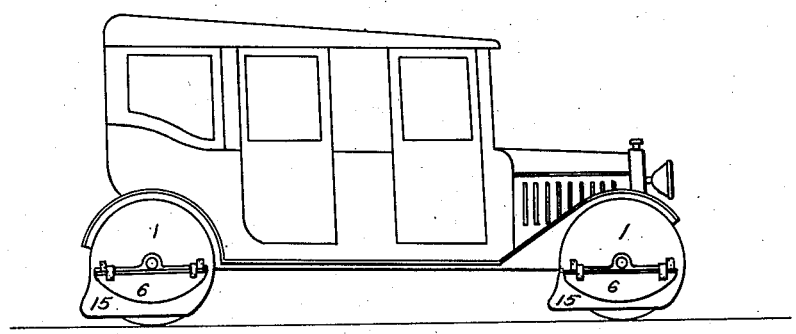
Figure 1 is a side view of the fender applied.
Figure 2:
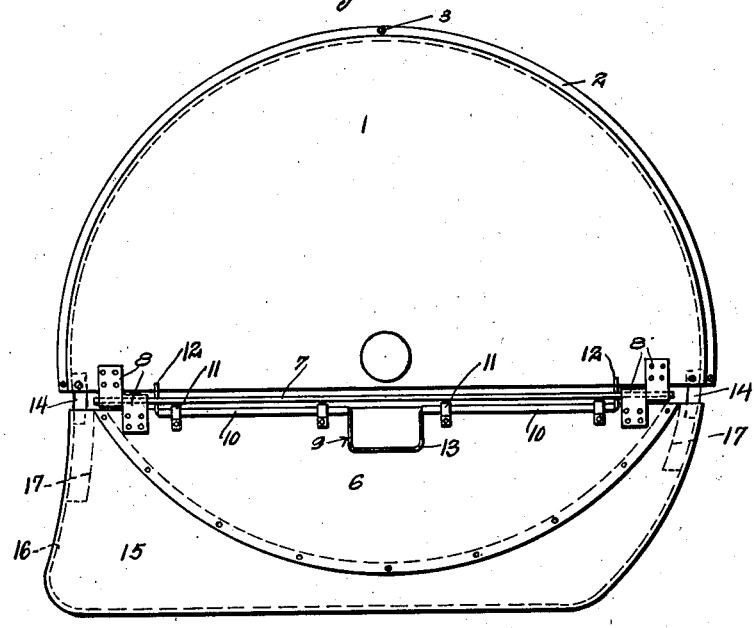
Figure 2 is a side view of the front fender.

A guard strip 15 of rubber or other suitable flexible material is secured to the lower portion of shield 6, this strip being reinforced by a wire 16 about which the edge of the strip is secured. As clearly shown in Fig. 2, wire 16 extends about the lower and front and rear portions of strip 15 and, due to its inherent resiliency, acts to normally hold the strip parallel with the guard member while permitting flexing or distortion of the strip when required. The strip is further reinforced at its upper corners by relatively thick elements 17 secured to the inner face of the strip. The shields 6 and strips 15 co-operate to effectually prevent splashing to either side of the wheel and thus serve to effectually protect pedestrians and to prevent splashing of mud etc. onto the body of the car. An angle bracket 18 is secured on the inner face of plate 1ª and is provided with an opening for receiving the bolt for securing the spindle in the knuckle of the front axle (Fig. 3). This provides simple and efficient means for attaching the inner plate of the fender to turn with the wheel. A collar 19 is mounted over the hub cap of the wheel and is secured by brace rods 20 to the wheel spokes. A stub-shaft 21 projects from this collar through a ring 22 which fits into a neck 23 of plate 1, a cap 24 being secured over this neck. Ball-bearings 25 are positioned between the stub-shaft and ring 22. This provides means for supporting the outer plate 1 while permitting freedom of rotation of the wheel.

The rear fender is similar to the front fender with the exception that bracket 18ᵃ is secured to axle housing A of the automobile by a U-bolt 26. The rear fenders are connected by transverse brace rods 27 which are connected by cross-rods 28 secured by U-bolts 29 to the axle housing A. The front fenders are also preferably connected by brace rods 30 which are loosely connected by cross rods 31. The brace rods for the front and rear fenders are not essential and may be dispensed with if desired, though I usually prefer to use these rods. As indicated herein, changes may be resorted to in details of construction and arrangement of parts of the invention without departing from the field and scope of the same, and I intend to include all such variations, as fall within the scope of the appended claim, in this application in which a preferred form only of my invention is disclosed.

What I claim is:—

In an automobile wheel fender, a casing adapted to fit about the upper portion of an automobile wheel, means for supporting said casing for movement with the wheel, shield members hinged to the lower end of the casing at the sides thereof, means for holding the shield members in parallelism with the sides of the casing, said means permitting outward movement of the shield members, flexible guard strips secured to the lower portions of the shield members, reinforcing wires secured to and extending about the lower and front and rear portions of the strips and acting to normally hold the same parallel with said shield members, and means for limiting inward movement of the shield members.

In testimony whereof I affix my signature.

LEMON M. SMITH.